(12) United States Patent
Hauser

(10) Patent No.: US 6,601,663 B2
(45) Date of Patent: Aug. 5, 2003

(54) ZERO TURN RADIUS OR ZTR VEHICLE WITH A ONE-PUMP TWO MOTOR MECHANISM

(75) Inventor: Hans Hauser, Strongsville, OH (US)

(73) Assignee: MTD Products Inc., Valley City, OH (US)

( * ) Notice: Subject to any disclaimer, the term of this patent is extended or adjusted under 35 U.S.C. 154(b) by 24 days.

(21) Appl. No.: 09/930,623

(22) Filed: Aug. 15, 2001

(65) Prior Publication Data

US 2002/0092685 A1 Jul. 18, 2002

Related U.S. Application Data

(60) Provisional application No. 60/225,286, filed on Aug. 15, 2000.

(51) Int. Cl.[7] .............................................. B60K 17/30
(52) U.S. Cl. .................. 180/6.3; 180/6.48; 180/308
(58) Field of Search .................. 180/6.3, 6.48, 180/6.32, 305, 308, 307

(56) References Cited

U.S. PATENT DOCUMENTS

| 3,579,988 A | * | 5/1971 | Firth et al. .................. 180/6.48 |
| 3,782,488 A | * | 1/1974 | Williamson ................. 180/6.48 |
| 3,812,925 A | * | 5/1974 | Lauck et al. ................. 180/6.2 |
| 3,916,625 A | * | 11/1975 | Holtkamp ..................... 37/352 |
| 4,242,922 A | * | 1/1981 | Baudoin ..................... 180/419 |
| 4,273,206 A | * | 6/1981 | van der Lely ............... 180/249 |
| 4,322,899 A | * | 4/1982 | Clune ........................ 180/216 |
| 4,395,878 A | * | 8/1983 | Morita et al. .................. 475/24 |
| 4,514,978 A | * | 5/1985 | Buschbom et al. ...... 280/5.509 |
| 4,565,257 A | * | 1/1986 | Hanson ....................... 180/406 |
| 4,671,376 A | * | 6/1987 | Ito et al. ..................... 180/249 |
| 4,875,536 A |   | 10/1989 | Saur et al. |
| 4,891,941 A | * | 1/1990 | Heintz ......................... 60/416 |
| 5,101,925 A | * | 4/1992 | Walker ....................... 180/243 |
| RE34,057 E |   | 9/1992 | Middlesworth |
| 5,848,664 A | * | 12/1998 | Kaspar ....................... 180/308 |
| 5,927,424 A | * | 7/1999 | Van Den Brink et al. .. 180/216 |
| 6,126,564 A | * | 10/2000 | Irikura et al. ................ 475/24 |
| 6,374,940 B1 | * | 4/2002 | Pickert ....................... 180/406 |
| 6,435,522 B1 | * | 8/2002 | Van Den Brink et al. ....................... 280/5.509 |

FOREIGN PATENT DOCUMENTS

DE           196 06 793 C1    4/1997

* cited by examiner

*Primary Examiner*—Lesley D. Morris
*Assistant Examiner*—Paul Royal, Jr.
(74) *Attorney, Agent, or Firm*—Brouse McDowell; Roger D. Emerson; Timothy D. Bennett

(57) ABSTRACT

A Zero Turn Radius vehicle is provided that utilizes a drive system including a single hydraulic variable displacement pump and dual variable displacement hydraulic motors connected respectively one to each of two ground engaging wheels for use in steering and propelling the vehicle. The configuration of the drive system allows for proper ZTR steering of the in the forward and reverse directions.

12 Claims, 8 Drawing Sheets

ZERO TURN RADIUS OR ZTR VEHICLE WITH A ONE-PUMP TWO MOTOR MECHANISM

This application claims priority from U.S. Provisional Application, Ser. No. 60/225,286 filed on Aug. 15, 2000, titled ZERO TURN POWER TRANSMISSION SYSTEM.

I. BACKGROUND OF THE INVENTION

A. Field of Invention

The present invention relates to the art of Zero Turn Radius drive systems utilizing a steering wheel, and more specifically to a Zero Turn Radius drive system using one pump in conjunction with two motors.

B. Description of the Related Art

It is known in the art to provide vehicles with drive systems that provide for Zero Turn Radius steering. Typically, Zero Turn Radius vehicles, or ZTR vehicles, provide dual steering levers that are independently operated for use in steering and propelling the vehicle. Each of the dual steering levers are connected to a respective drive device, such as a hydrostatic drive, that are, in turn, connected to individual ground engaging wheels for use in propelling and steering the vehicle.

Such ZTR vehicles provide for greater mobility of the vehicle, in that the ZTR vehicle can make tighter returns. However, the operator is required to learn how to steer a ZTR vehicle with the dual lever steering system, which is inherently different from the usual steering wheel adapted for use on most driving vehicles and cumbersome to inexperienced operators.

Some devices incorporate a steering wheel onto a ZTR vehicle. One such device is disclosed in U.S. Pat. No. Re 34,057, which includes a driving and steering mechanism for a vehicle having a pair of driving wheels. The patent further discloses that the driving and steering mechanism includes a pair of floating links pivotally connected at one end to a respective transmission control arm. The floating links are further disclosed to operate so as to integrate outputs from a steering wheel and an accelerator foot pedal.

One aspect of the aforementioned device is that the mechanism does not allow for proper steering, when the vehicle is being propelled in the reverse direction; as its does when the vehicle is being propelled in the forward direction. In the instance, where the accelerator pedal is engaged to drive the vehicle in a forward direction and where the steering wheel is turned so as to provide a right turn, depressing the accelerator pedal causes the vehicle to make a right-hand forward turn. With the steering wheel still turned to make a right hand turn and where the accelerator pedal is now engaged to drive the vehicle in the reverse direction, the device of Pat. No. Re 34,057 causes the steering mechanism of the vehicle to make a left-hand rearward turn, instead of a right-hand rearward turn, usually associated with vehicles incorporating a steering wheel.

The present invention obviates the aforementioned problem, while providing a cost effective and efficient hydrostatic drive system. Still, other objects and advantages of the invention will appear from the following detailed description of the preferred embodiment of the invention with reference being made to the accompanying drawings.

II. BRIEF SUMMARY

It is an object of the present invention to provide a steering mechanism that utilizes hydrostatic drives to provide for the proper steering of a ZTR vehicle in both the reverse in forward directions.

It is another object of the present invention to provide a drive system that utilizes a single hydraulic pump in conjunction with two hydraulic motors to propel and steer a ZTR vehicle.

Is still another object of the present invention to provide a drive system that utilizes a double acting variable displacement hydraulic pump, in conjunction with dual double acting variable displacement hydraulic motors.

It is yet another object of the present invention to provide a drive system that incorporates a steering wheel onto a ZTR vehicle.

It is still yet another object of the present invention to provide a drive system that incorporates a steering wheel, operably connected to dual hydraulic motors, for use in steering a ZTR vehicle.

It is yet another object of the present invention to provide a lawnmower having ZTR capabilities that incorporate a steering wheel in conjunction with a single pump and two hydraulic motors.

It is yet another object of the present invention to provide an accelerator peddle that is connected to a single variable displacement hydraulic pump that operates to selectively adjust the speed and direction in which the vehicle is propelled.

It is another object of the present invention to provide a ZTR vehicle that incorporates a steering wheel and an accelerator peddle into a hydrostatic drive system that provides for proper steering in the forward and reversed directions.

It is still yet another object of the present invention to provide a ZTR vehicle having steering input that functions independent from that of the accelerating input of the vehicle.

There is provided in the present invention a drive system that incorporates a single double acting variable displacement hydraulic pump that is communicated by way of a fluid power hydraulic circuit, in parallel, to two double acting variable displacement hydraulic motors. Each of the two variable displacement hydraulic motors are respectively connected to one of two ground engaging wheels, so as to transfer rotational power from the motor to the wheel for use in steering and propelling the vehicle. The hydraulic pump includes a pintle shaft that is mechanically connected to an accelerator pedal. The accelerator pedal is selectively operable to be adjusted in first and second directions about a fixed pivot point. When the accelerator pedal is adjusted in the first direction, mechanical linkage from the pedal to the pintle shaft engages the hydraulic pump to provide fluid power in the first direction. Likewise, when the accelerator pedal adjusted in the second direction, fluid power from the hydraulic pump flows in a reverse direction. A steering wheel is included that is mechanically connected to the hydraulic motors. First and second steering links are respectively connected, one to each of the pintle shafts on the hydraulic motors. When the steering wheel is selectively adjusted in a first direction, the pintle shaft on the first hydraulic motor is adjusted toward a first direction, wherein the power output to the first drive wheel is increased with respect to a forward direction of travel. At the same time, the pintle shaft on the second hydraulic motor is adjusted toward a second direction, wherein the power output of the drive wheel is decreased with respect to a forward direction of travel. In this manner, when the steering wheel is adjusted in a first direction, depressing the accelerator pedal causes the vehicle to make a forward turn in the first direction. Likewise, with the steering wheel still turned in the first direction and when the accelerator peddle is engaged in a second direction so as to drive the vehicle in reverse, the ZTR vehicle makes a rearward turn in the first direction.

III. BRIEF DESCRIPTION OF THE DRAWINGS

The invention may take physical form in certain parts and arrangement of parts, a preferred embodiment of which will be described in detail in this specification and illustrated in the accompanying drawings, which form a part hereof and wherein.

IV. DESCRIPTION OF THE PREFERRED EMBODIMENT

Figure 1:
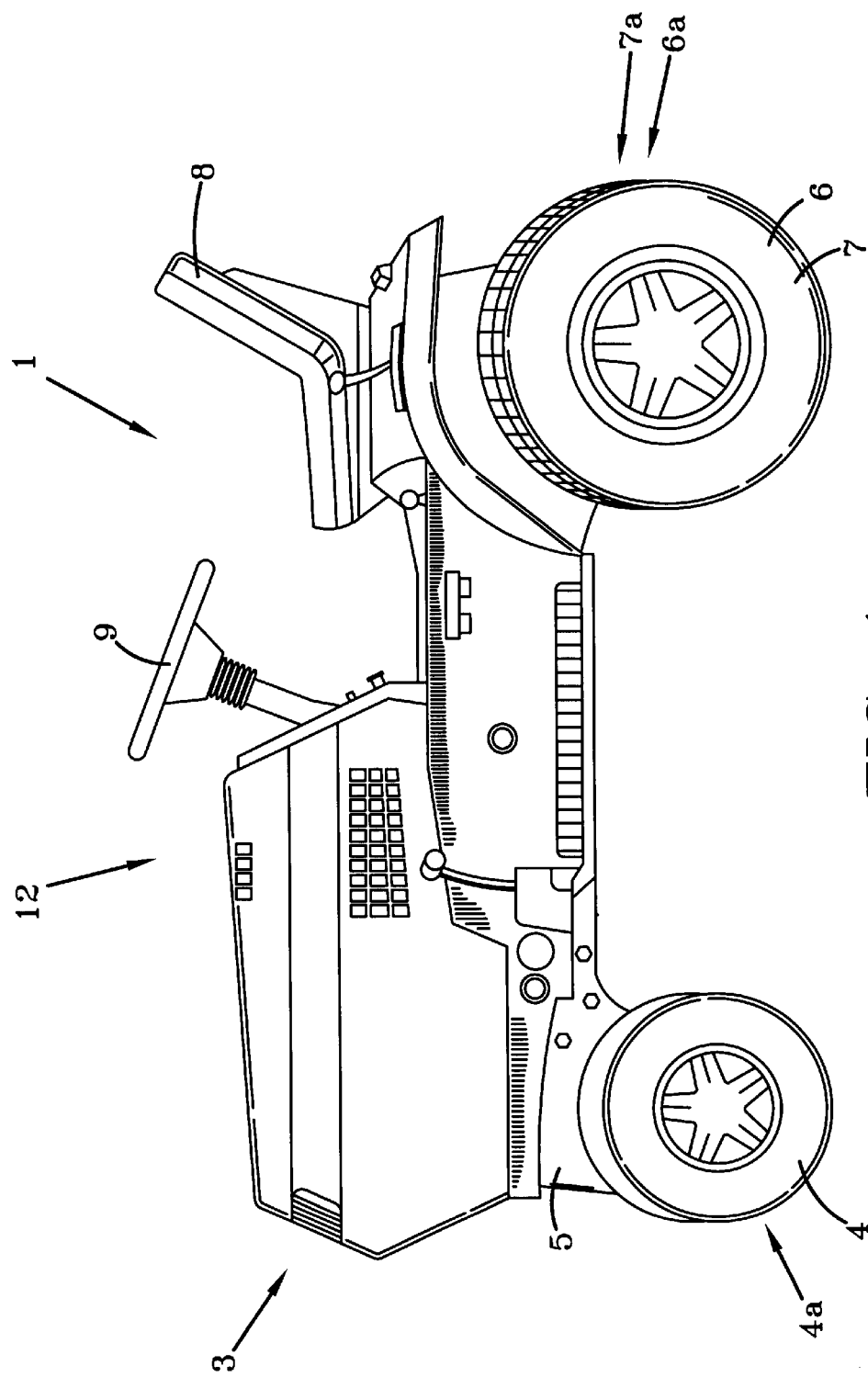
FIG. 1 is a side view of a ZTR vehicle.

Referring now to the drawings, wherein the showings are for purposes of illustrating a preferred embodiment of the invention only and not for purposes of limiting the same, FIG. 1 depicts a Zero Turn Radius vehicle shown generally at 1, also known as a ZTR vehicle. The ZTR vehicle 1 includes first and second front ground-engaging devices 4, 4a, which may be ground-engaging wheels 4, 4a. Additionally, the vehicle 1 also includes first and second rear ground-engaging means or devices 6, 6a, which, in the preferred embodiment, are rear ground-engaging wheels 7, 7a. However, any ground-engaging means of providing mobility to the vehicle may be chosen with sound engineering judgment, including track driven devices. Each of the ground engaging devices 4, 4a, 6, 6a or 7, 7a are driveably connected to a frame 5 of the vehicle 1 for use in providing mobility to the vehicle. In the preferred embodiment, the rear ground engaging wheels 7, 7a are rotatably attached to the frame 5, in a manner consistent with the present invention. An engine shown generally at 3 is fixedly attached to the frame 5 of the vehicle 1. The engine 3 may include an output shaft, not shown, for use in providing power to an implement of the vehicle 1 and/or for use in supplying power to drive the vehicle 1. A drive system 14, shown clearly in FIG. 2, receives power from the engine 3 and delivers output independently to each of the first and second ground-engaging devices 6, 6a. The drive system 14 will be discussed in greater detail in the following paragraphs. The ZTR vehicle 1 further includes an operator seat 8 for the operator to sit in during operation of the vehicle 1. A steering member 9 is also shown to provide steering input for the vehicle 1, as will also be discussed in greater detail in a subsequent paragraph. Likewise, an accelerator member shown generally at 12 in FIG. 1 is pivotally connected with respect to the frame 5 and selectively engageable in first and second pivoting directions (shown as A and B in FIG. 4) for use in actuating the vehicle 1 to drive in forward and reverse directions. The accelerator member 12 may include a default or neutral position (shown as C in FIG. 4), wherein the drive system remains idle. In other words, when the accelerator member 12 is in the neutral position, the vehicle 1 is not being driven in a forward or a reverse direction. Additionally, the accelerator member 12 may be selectively, infinitely positionable between the neutral position and a maximum accelerator member position in both the forward and reverse directions, which will be discussed in greater detail in a subsequent paragraph.

Figure 1A:
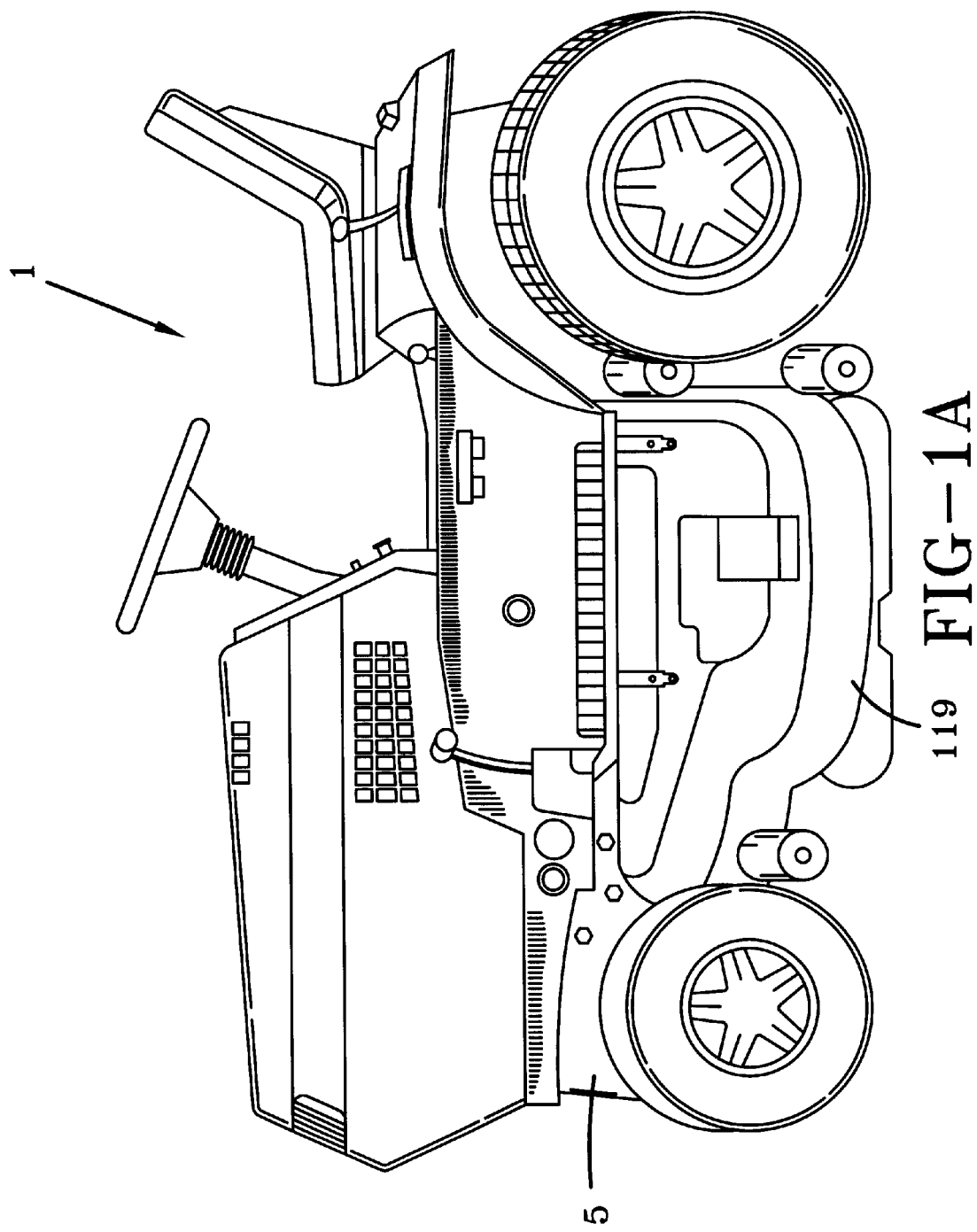
FIG. 1a is a side view of a ZTR lawn mower.

With reference to figure 1a, it is contemplated that the present invention may be incorporated onto a vehicle 1 that is a vegetation or lawn mower having a mower deck 119, as shown clearly in FIG. 1a. The mower deck 119 may be mounted to the frame 5 of the vehicle 1 in any manner chosen with sound engineering judgment.

Figure 2:
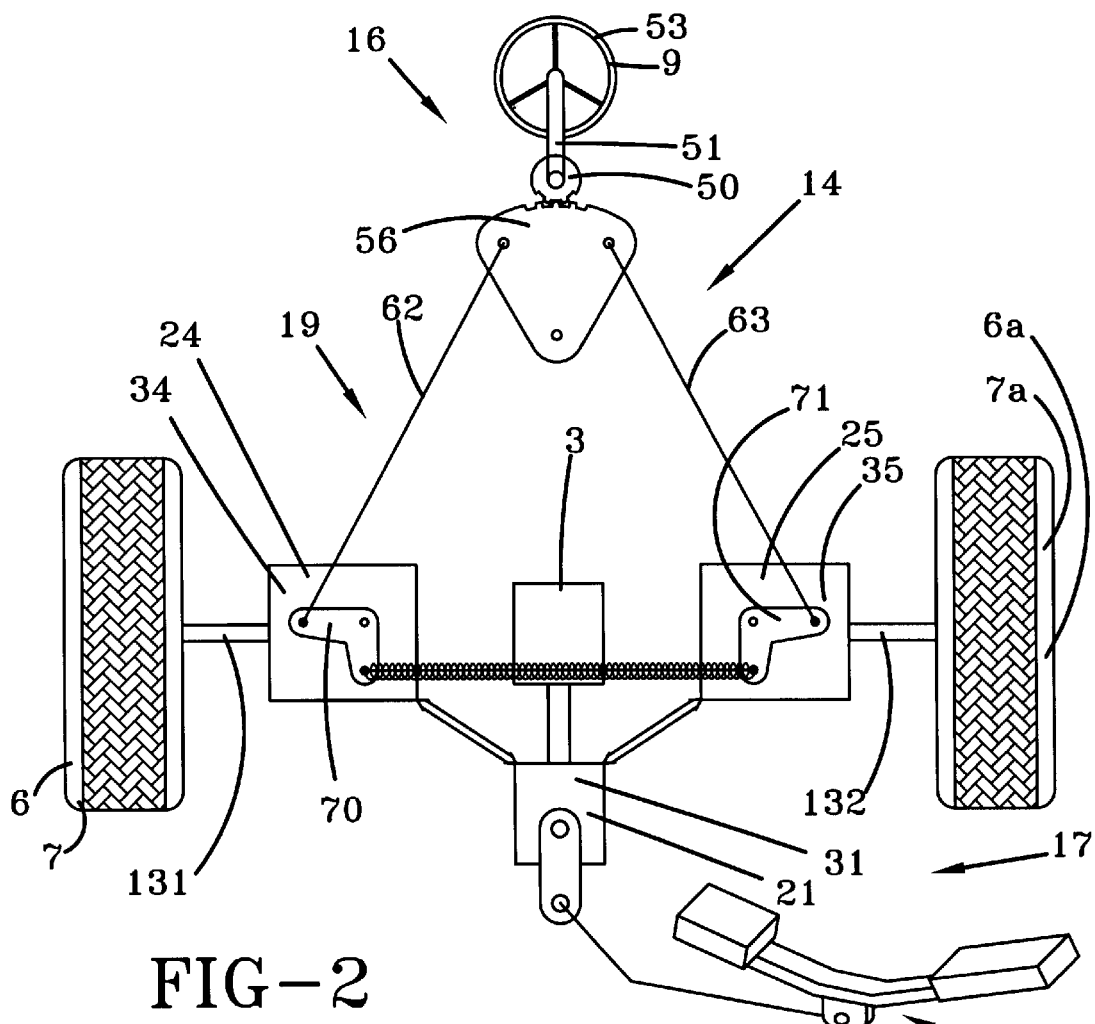
FIG. 2 is a schematic representation of the drive system of the present invention.

With reference now to FIG. 2, a schematic representation of the drive system 14 is shown. The drive system 14 includes a means for accelerating the vehicle 17, a means for steering the vehicle 16, and a hydrostatic drive means 19. In the preferred embodiment, the hydrostatic drive means 19 includes a pumping means 21 and first and second actuators 24, 25. The pumping means 21 may be a double acting variable displacement hydraulic pump 31, that is operatively coupled to the engine 3 in a manner well known in the art. In this way, power output from the engine 3 is transferred to the pumping means 21 for use in providing power to operate the pumping means 21. The pumping means 21 is, in turn, operatively connected to the first and second actuators 24, 25. Each of the first and second actuators 24, 25 are respectively connected to the ground engaging devices 6, 6a. In the preferred embodiment, the first and second actuators 24, 25 are first and second double acting variable displacement hydraulic motors 34, 35, or first and second hydrostatic motors 34, 35. The first and second double acting hydraulic drive motors 34, 35 include output shafts 131, 132 that may be coupled to first and second rear ground engaging wheels 7, 7a, respectively, so that, when the hydraulic motors 34, 35 are engaged, rotational power is transferred to the first and second ground engaging wheels 7, 7a, respectively. In other words, when the first hydraulic motor 34 is engaged, rotational output power is transferred to the first ground-engaging wheel 7. In this manner, the output shaft 131 is a first steering output. Similarly, when the second hydraulic motor 35 is engaged, rotational output power is transferred to the second ground engaging wheel 7a. Likewise, the second output shaft 132 is a second steering output. It is expressly noted that the first hydraulic motor 34 is coupled to the first ground engaging wheels 7, independent of the second hydraulic motor 35 being coupled to the second ground engaging wheels 7a. In other words, the first and second ground engaging wheels 7, 7a may be independently driven. Any manner of operatively connecting the hydraulic motors 34, 35 to the ground engaging means 6, 6a, respectively, may be chosen with sound engineering judgment.

Figure 2A:
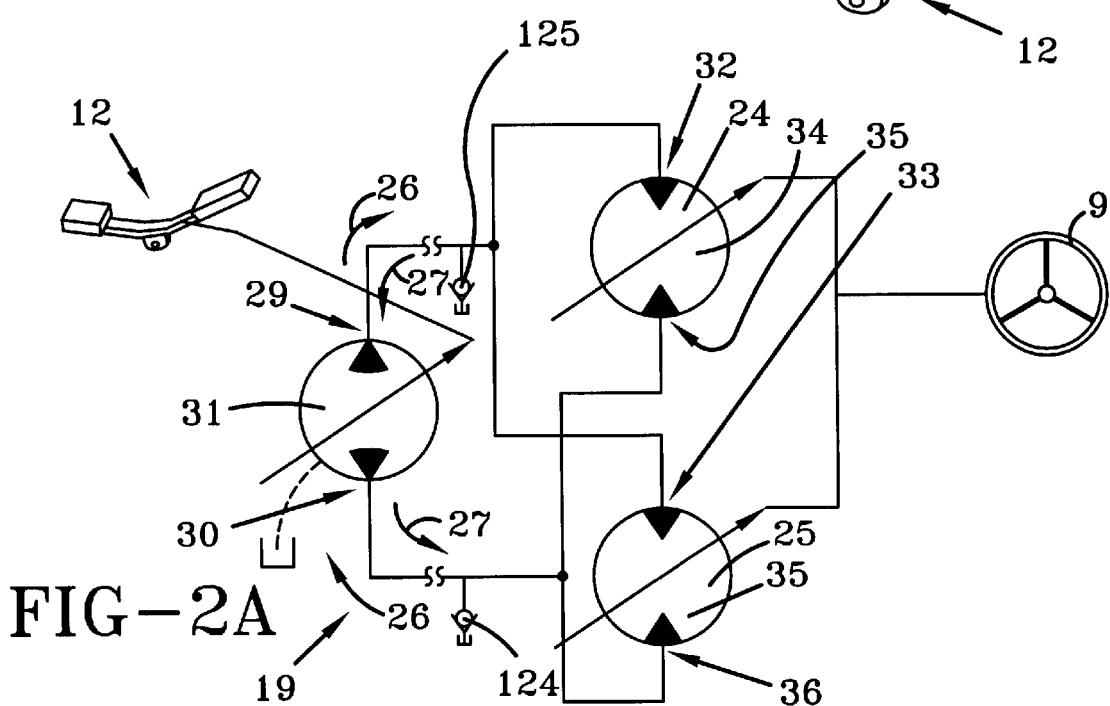
FIG. 2a is a schematic representation of the fluid power circuit of the drive system.
Figure 4:
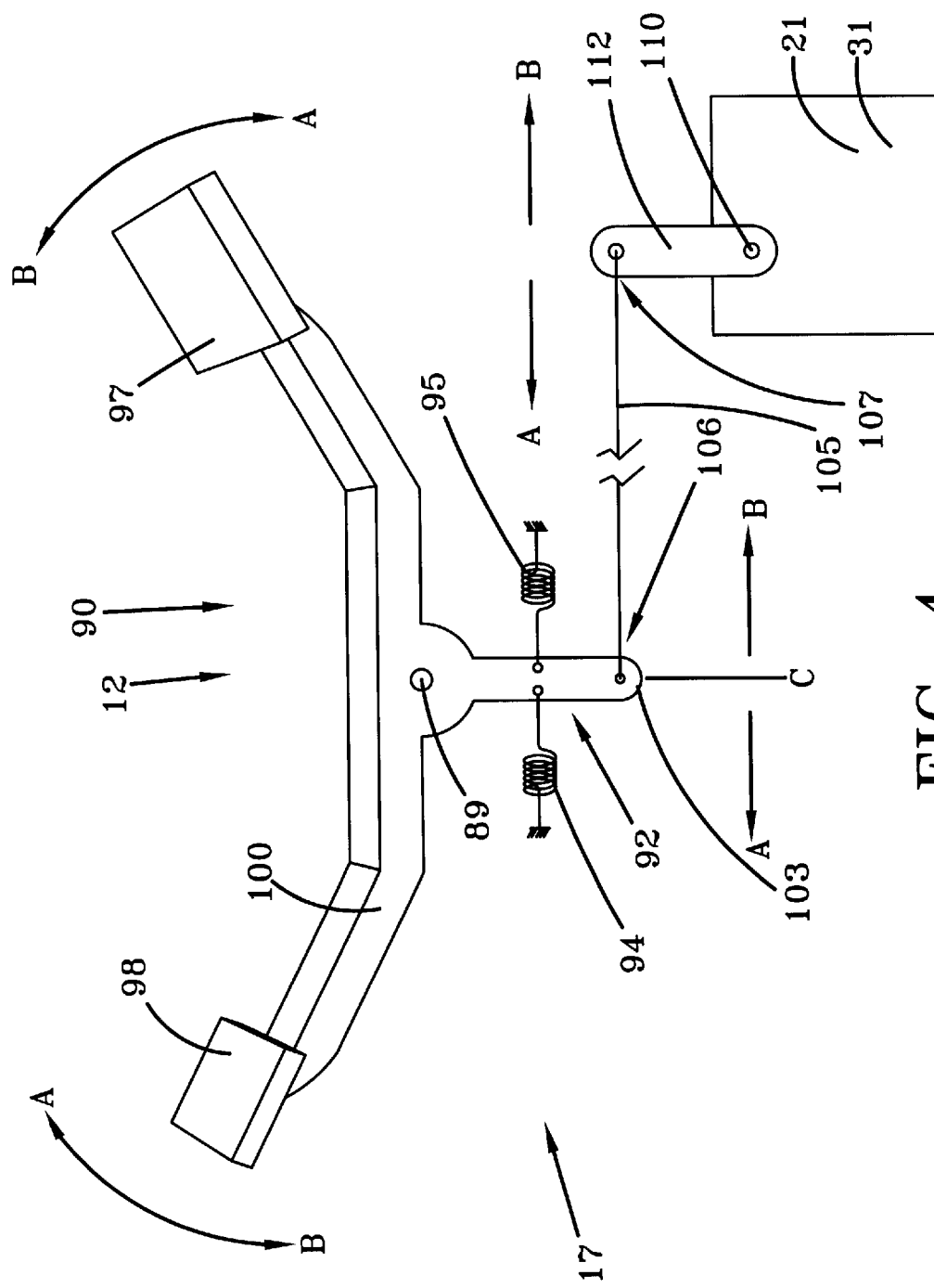
FIG. 4 is a schematic representation of the accelerating means.

With continued reference to FIG. 2 and now also to FIG. 2a, a schematic representation of the hydrostatic drive means 19 is shown. In the preferred embodiment, the drive system 14 incorporates fluid power to provide mobility to the vehicle 1. Output power or output fluid power from the pumping means 21 may be connected in parallel to the first and second hydraulic actuators 24, 25, as clearly shown in FIG. 2a. That is to say that the pumping means 21 provides at least a first output that is hydraulically connected to each of the first fluid power inputs of the first and second hydraulic actuators 24, 25. As previously stated, the preferred embodiment of the present invention includes a double acting variable displacement hydraulic pump 31, as part of the pumping means 21. In this manner, the hydraulic pump 31 has first and second fluid power outputs that flow in first and second directions 26, 27. In the first direction 26, fluid power output of the hydraulic pump 31 flows from a first port 29, as schematically shown in FIG. 2a, to first ports 32, 33 of the first and second hydraulic actuators 24, 25, respectively. In this manner, the fluid power output from the hydraulic pump 31 is connected in parallel to the first and second hydraulic actuators 24, 25. Likewise, in the second direction 27, fluid power output of the hydraulic pump 31 may also flow from second port 30 to second ports 35, 36 of the first and second hydraulic actuators 24, 25, respectively. It is expressly noted, at this point, that additional hydraulic componentry or circuitry may be incorporated in the hydraulic system, as is chosen with sound engineering judgment. As is well known in the art, the fluid power output of a double acting variable displacement hydraulic pump 31 is caused to flow in first and second directions 26, 27, by the selective adjustment of a swash plate or wobble plate contained within the pump, not shown in the figures. Typically, a pintle shaft, similar to 110 shown in FIG. 4, is operatively connected to selectively adjust the swash plate or wobble plate. In that the selective adjustment of swash plates and the operation of double acting variable displacement hydraulic pumps is well known in the art, no further explanation will be offered at this point.

Figure 2B:
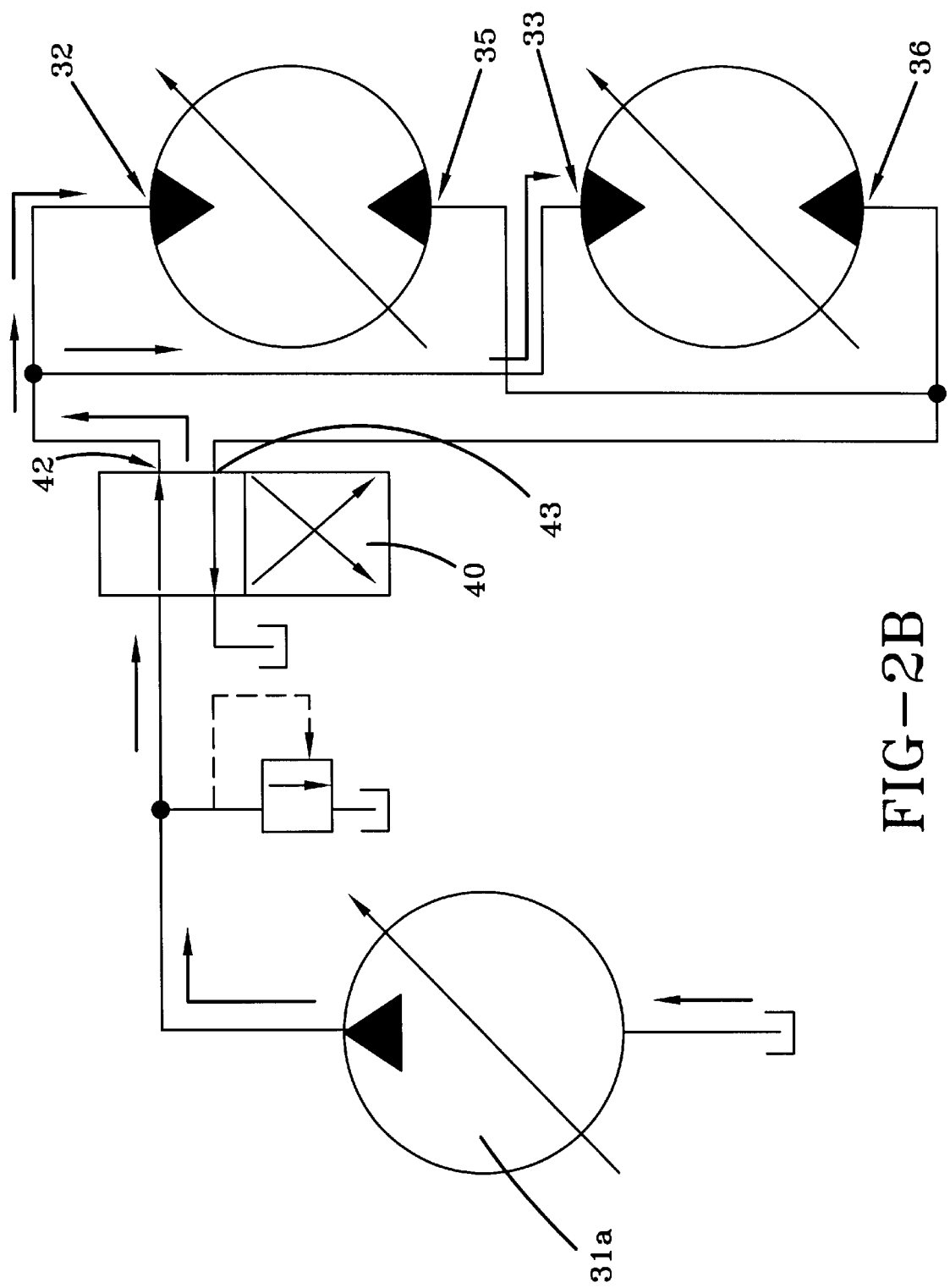
FIG. 2b is a schematic representation of a fluid power circuit for an alternate embodiment of the fluid power circuit of the present invention.
Figure 2C:
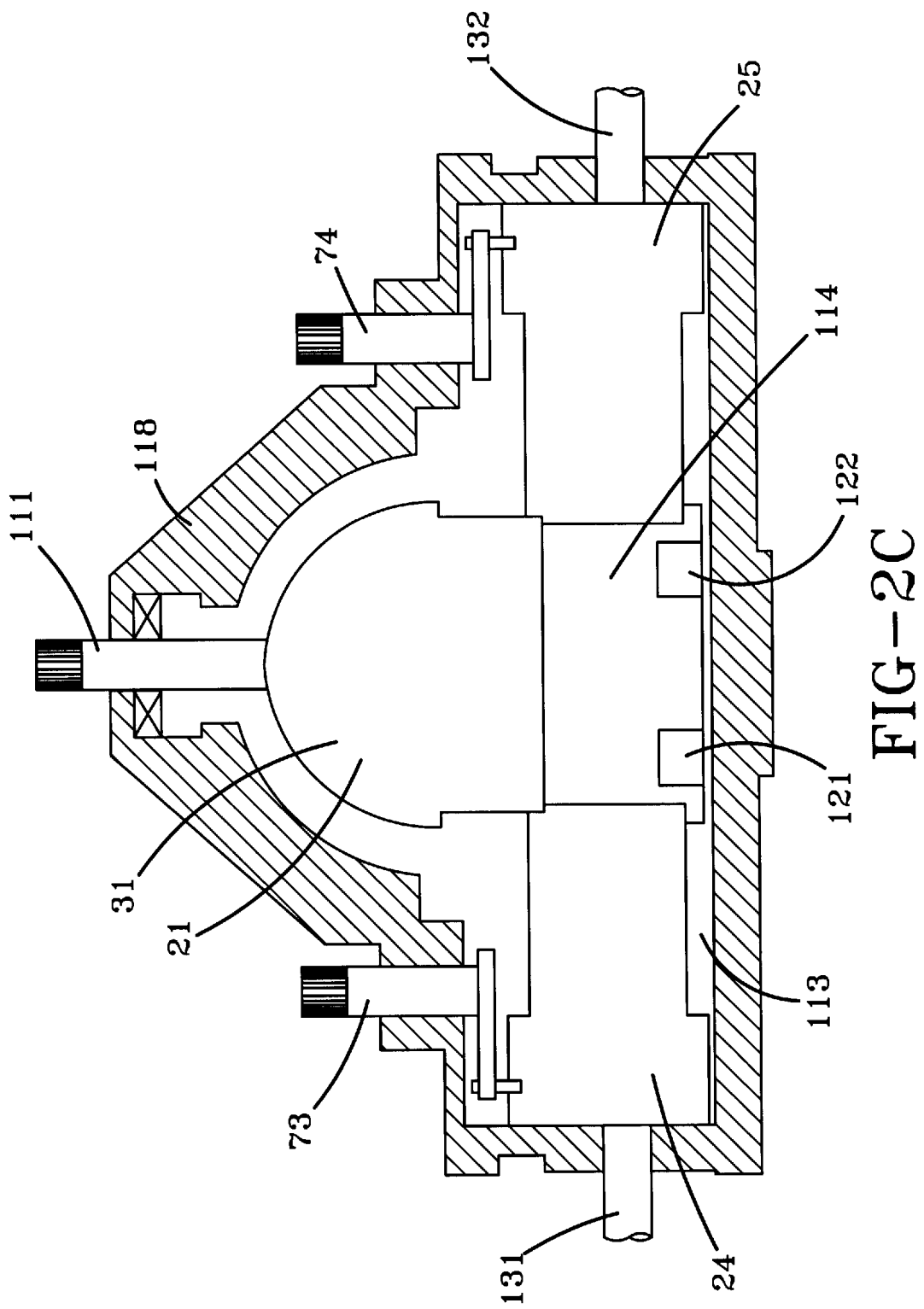
FIG. 2c is a cutaway view of the hydrostatic system contained within a singular housing.

Referencing FIGS. 2a and 2c, the hydraulic pump 31 and the first and second hydraulic actuators 24, 25 may be consolidated into a singular housing 118. In this manner, the first and second fluid power outputs of the hydraulic pump 31 are in close proximity to the fluid power inputs of the actuators 24, 25. The hydraulic pump 31 includes a power input shaft 111 that may be directly operatively connected to the output power shaft, not shown, of the engine 3 as previously mentioned. It is expressly noted that any means of directly connecting output power from the engine 3 to the power input shaft 111 of the hydraulic pump 31 may be chosen with sound engineering judgment. The hydraulic actuators 24, 25 may include intake ports 121, 122 for use in drawing hydraulic fluid from a hydraulic fluid source, such a reservoir. In the preferred embodiment, the housing 118 comprises the hydraulic fluid source or reservoir 113. The intake ports 121, 122 may be operatively connected to the hydraulic fluid source via check valves 124, 125, shown schematically in FIG. 2a. However, any means of providing hydraulic fluid to the intake ports 121, 122 may be chosen with sound engineering judgment. This may be necessary to prevent cavitation of the hydrostatic drive 19 under certain modes of operation.

With continued reference to FIG. 2c, a manifold 114 is shown communicating fluid power from the hydraulic pump 31 to the motors 34, 35. It is noted that manifold 114 includes the intake ports 121 and 122, which may draw additional hydraulic fluid from the reservoir 113 as needed for operation of the drive means 19. It is noted that any means of configuring the manifold 114 to communicate fluid power between the hydraulic pump 31 and the motors 34, 35 may be chosen with sound engineer judgment that is consistent with the operation of the present invention. In this manner, the hydrostatic drive means 19 is completely self-contained. It is noted that a Power Take Off shaft 170, shown in FIG. 5, may be included to extend from the housing 118 as will be discussed in a following paragraph.

With continued reference to FIGS. 2 and 2a and now to FIG. 2b, an alternate embodiment is contemplated, wherein the pumping means 21 includes a variable displacement hydraulic pump 31 a, having a fluid power output flowing in only one direction and a two position directional valve 40. In this embodiment, fluid power output is communicated in parallel from a first port 42 of the directional valve 40 to the first ports 32, 33 of the first and second hydraulic actuators 24, 25 and respectively from the second port 43 of the directional valve 40 to the second ports 35, 36 of the first and second hydraulic actuators 24, 25.

Figure 3:
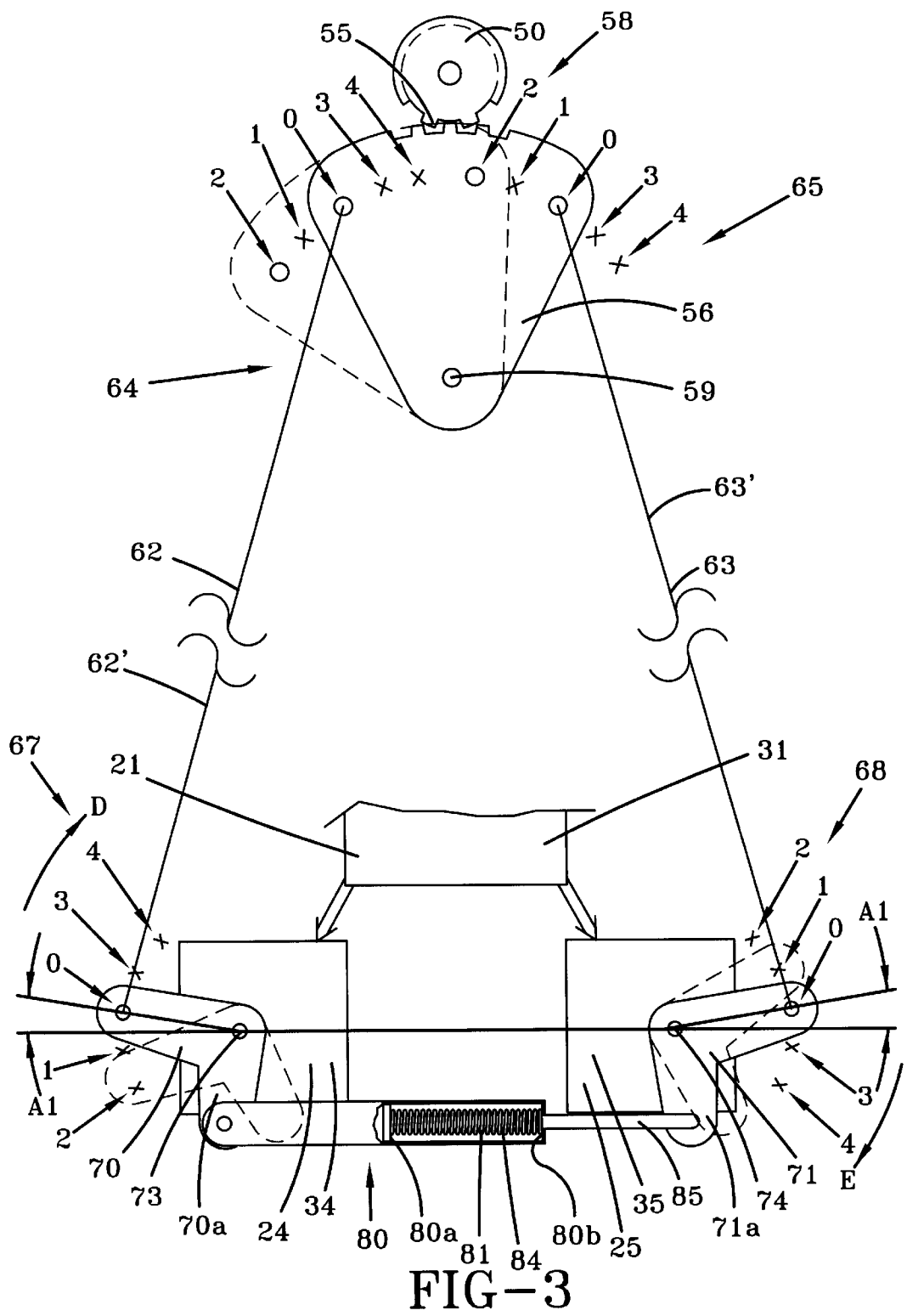
FIG. 3 is a schematic representation of steering means.

With continued reference to FIG. 2 and now to FIG. 3, steering means 16 includes a steering member 9 that is shown connected to a steering gear 50, via steering shaft 51. In the preferred embodiment, steering member 9 is a steering wheel 53 that may be selectively adjusted or rotated in first or second directions, which may be clockwise and counter-clockwise directions. The steering gear 50 may include gear teeth 55 that meshingly engage with teeth 58 of steering disk 56. The steering disk 56 may be pivotally attached to the frame 5, via pivot pin 59, as clearly shown in FIG. 3. In this manner, rotation of the steering member 9 synchronously rotates steering gear 50, which rotates steering disk 56 about pivot pin 59. In the preferred embodiment, the steering means 16 further includes first and second steering links 62 and 63. The first and second steering links 62, 63 have first 64, 65 and second 67, 68 ends respectively. The first ends 64, 65 of the steering links 62, 63 are fixedly attached, one to each side of the steering disk 56, as clearly shown in FIG. 3. Likewise, the second ends 67, 68 of the steering links 62, 63 are fixedly attached to first and second actuators 24, 25, in a manner to be described subsequently. In this way, the steering member 9 is operatively communicated to both of the first and second actuators 24, 25. In the preferred embodiment, steering links 62, 63 may be flexible, tension-bearing cables 62', 63' that transfers tension force in a manner consistent with the present invention. However, any means of transferring tension forces may be chosen with sound engineering judgment, including rigid mechanical rod members that transfer both tension and compression forces. The second ends 67, 68 of the steering cables 62', 63' are fixedly attached to first and second hydraulic actuators 24, 25, via pintle links 70, 71. As previously stated, in the preferred embodiment, the first and second hydraulic actuators 24, 25 are first and second double acting variable displacement hydraulic motors 34, 35, respectively. However, it is expressly noted, at this point, that any type of hydraulic actuator may be used that transfers power in a manner consistent with the present invention. As is well known in the art, variable displacement motors include swash plates or wobble plates, not shown, similar to that of variable displacement pumps that are selectively adjusted, via a pintle shaft. As the operation and selective adjustment of variable displacement motors via the pintle shaft is well known in the art, no further explanation will be offered at this point. The pintle links 70, 71 are rigidly connected to pintle shafts 73, 74 of the hydraulic motors 34, 35 respectively. In this manner, selective adjustment of the steering member 9 transfers input forces from the steering disk 56, via steering cables 62', 63', to each of the pintle shafts 73, 74 of the hydraulic motors 34, 35, respectively. Adjustment of the pintle shafts 73, 74 comprise first and second steering inputs. The pintle links 70, 71 may include extension link portions 70a, 71a as shown in FIG. 3. As depicted, the pintle links 70, 71 may be "L" shaped. The extension link portions 70a, 71a may be mechanically connected together via rod member 80. In the preferred embodiment, the rod member 80, being substantially rigidly, connects the pintle links 70, 71 together so that when one of the pintle links 70, 71 is adjusted, via cable 62' or 63', the opposing pintle link 71, 70 is also synchronously adjusted, but in the opposite direction with respect to driving the vehicle in a specified direction of travel. For instance, adjustment of the pintle link 70 to drive the motor 34 increasingly forward, which means adjusting the pintle link 70 forward as indicated by arrow "D" shown in FIG. 3, results in tension force being applied via the rod member 80 to pull pintle link 71, via extension link portion 71a, in the opposite direction "E" as indicated by the arrow in FIG. 3, which drivingly decreases the output power of motor 35 with respect to a forward direction of travel of the vehicle. In this way, selectively adjusted member 9 results in synchronous adjustment of both of the first and second steering inputs. The rod member 80 may be composed of first and second rod member portions 84, 85 that cooperate to linearly expand under certain operating conditions. The first rod member portion 84 includes a stop end 80b. Likewise, the second rod member portion 85 includes a stop end 80a, wherein both of the stop members function to limit the amount that the rod member can be linearly expanded. A spring member 81 may be included and disposed between stop ends 80a, 80b. The spring member 81 is sufficiently stiff so that when the steering member 9 is selectively adjusted the rod member 80 functions as a rigid rod member. When one of the steering cables 62' or 63' is placed under tension, as when adjusting one of the link members 70, 71, the respective extension link member 70a or 71a moves to compress the spring member 81. In that the spring member 81 is sufficiently stiff, the rod member 80 responds as a rigid rod member 80 and transmits force to adjust the opposing pintle link 71 or 70 synchronously. In the instance during steering in a first direction where one of the pintle links 70, 71 has been adjusted so that the swash plate, not shown, of the respective motor 34, 35 is at maximum stroke and the other swash plate of the opposing motor 35, 34 is not at a maximum stroke, increased steering in the same direction results in continued steering input to the opposing motor 35, 34 and continued resulting steering output from the opposing motor 35, 34.

With continued reference to FIG. 2 and now to FIG. 4, accelerating means 17 includes an accelerator member 12 that may be pivotally connected to the frame 5 of the vehicle 1, via pin 89. In the preferred embodiment, the accelerator member 12 may be a foot pedal 90. However, it is noted, at this point, that any levering means pivotally connected to the frame for use as an accelerator member 12 may be chosen with sound engineering judgment, including hand operated levers. The foot pedal 90 is selectively adjustable in directions A, B, as clearly shown in FIG. 4. As previously stated, the foot pedal 90 may reside in a default position, C. Additionally, the foot pedal 90 may be biased into the default position C by biasing means 92, wherein, the biasing means may be comprised of coil springs 94, 95 fixedly attached each at one end to the foot pedal 90 and at a second and to the frame 5 of the vehicle 1, as clearly shown in FIG. 4. However, it is noted that any means the biasing the foot pedal 90 into a default or neutral position may be chosen with sound engineering judgment. The foot pedal 90 may include first and second foot pads 97, 98 disposed at distal ends of a foot pedal bar 100, which, as previously stated, is pivotally connected at pin 89, as clearly shown in FIG. 4. Selective adjustment of the foot pedal 90 in the direction A may be accomplished by depressing the first footpad 97. Similarly adjustment of the foot pedal in the direction B may be accomplished by depressing the second footpad 98. It is expressly noted that the foot pedal 90 may be infinitely positionable between neutral or default position C and either of maximum adjustment positions in the A, B directions. A connector link 103 extends from the foot pedal bar 100 proximate the pin 89. A connector link 103 may be a rigid member integrally formed with the foot pedal bar 100. An accelerator link 105 has first and second ends 106, 107 respectively. The first end 106 of the accelerator link 105 is fixedly attached to the connector link 103, while the second end 107 of the connector link 105 is fixedly attached to the pintle shaft 110 of the hydraulic pump 31, via pintle link 112. In the preferred embodiment, the accelerator link 105 is a rigid mechanical linkage operable to transmit both tension and compression forces. In this manner, selective pivotal adjustment of the foot pedal 90 translates into linear displacement of the accelerator link 105, which, consequently, adjusts the pintle link 112 in first and second directions, A, B for use in adjusting the swash plate and the fluid power output of the pump 31. It is noted that any means may be chosen to transmit rotational motion, as of a foot pedal 90, into linear motion, for use in adjusting the pintle shaft of the hydraulic pump 31.

With reference again to FIGS. 1 through 4, operation of the present invention will now be discussed. With the vehicle 1 turned on so that power from the engine 3 is operable to be transmitted to the pump 31, an operator may sit in the operator seat 8 grasping the steering wheel 53 with the operator's hands and may place the operator's foot on the foot pedal 90. To engage the vehicle to drive the vehicle in the forward direction, the operator may selectively depress the foot pad 97 of the foot pedal 90 to any desired position between the neutral position C and the maximum forward position of the A, or forward direction, reference FIG. 4. As the operator depresses the foot pedal 90 in this manner, the pintle shaft 110 of the pump 31 is displaced proportionate to the amount of displacement that the foot pedal 90 is depressed, resulting in the offset, or stroking, of the swash plate of the pump 31 in a first direction 26, reference FIG. 2a, and further resulting in fluid power output being communicated to each of the ports 32, 33. In other words, depression of the foot pedal 90 results in fluid power being communicated in parallel to the hydraulic motors 34, 35. Operation of the vehicle in this mode is indicated in FIG. 3 by position "0" on the steering disk 56. In this manner, input from the foot pedal 90 in adjusting the pintle shaft 110 comprises a vehicle-speed input. FIG. 3 shows the pintle links 70, 71 offset by an angle A1 from a neutral or non-actuated position. In this manner, the swash plates of the motors 34, 35 are positioned to allow fluid power to drive the motors 34, 35 at substantially the same rate, without input from the steering wheel 53. It is noted at this point that in light of the nominal forward offset of the pintle links 70, 71 and in that the pintle links 70, 71 are synchronously adjusted in opposite directions, both of the pintle links 70, 71 together can generally never both reside at a non-actuated position. Additionally, as one of the pintle links 70, 71 is selectively adjusted in one direction, fluid flowing in the drive means 19 is diverted to the appropriate motor 34 or 35 as demand for fluid power is required by the selective adjustment of the pintle links 70, 71. In that the stroking of swash plates for hydraulic pumps and motors is well known in the art, no further explanation will be provided here. Additionally, any degree of angular offset of the pintle links 70, 71 may be chosen with sound engineering judgment, so as to optimize performance of the ZTR vehicle 1. It is expressly noted that increased angular displacement of the foot pedal 90 in the A direction results in additional stroke being applied to the swash plate of the pump 31, which results in a proportionate increase in the magnitude of fluid power communicated to the motors 34, 35 and an increase in rotational output power to the wheel 7, 7a. In this manner, the rate of the speed of the vehicle 1 is controlled by the angular displacement of the foot pedal 90. In the instance, where the operator depresses the footpad 98 of the foot pedal 90, the swash plate of the pump 31 is stroked in the opposite direction, resulting in fluid power being communicated to the motors 34, 35 in direction 27, shown clearly in FIG. 2a. This drives the motors 34, 35 in the opposite direction, causing the steering outputs and wheels 7, 7a of the vehicle 1 to be driven in the opposite or reverse direction.

With reference to FIGS. 1 through 4, operation of the steering of the vehicle will now be discussed. When the operator turns the steering wheel 53 to the left or in a counterclockwise direction, steering cable 63', under tension force, adjusts the pintle link 71 to increase the steering output of the shaft 132, with respect to a forward direction of travel, as indicated by position "1" on the steering disk 53. At the same time the steering input to motor 34 is decreased with respect to a forward direction of travel resulting in decrease output power being applied to the steering output of the shaft 131. In this manner, reduced output power is applied to wheel 7 at the same time that increased output power is applied to wheel 7a proportionately, each with respect to a forward direction of travel, resulting in a forward left hand turn. With continued turning of the steering wheel 53 to position "2", the steering input of motor 35 is increased with respect to a forward direction of travel. Likewise, at the same time, the pintle shaft 70 is further decreased with respect to a forward direction of travel or adjusted past the centerline resulting in the motor 34 being driven in the opposite direction, because the swash plate has shifted past center to the reverse operating condition. In this manner, drive wheel 7 is being driven in the reverse direction and drive wheel 7a is being driven in the forward direction, resulting in a zero radius turn to the left. It is expressly noted at this point that the increase and decrease in output power may be increases and decreases in torque applied to shafts 131, 132. In other words, an increase in output power with respect to a forward direction of travel relates to increased torque, or potential torque capacity, being applied to one of the shafts 131, 132 that would drive the shaft 131, 132 and the respective wheel 7, 7a in a forward direction. Likewise, a decrease in the output power with respect to a forward direction of travel relates to a decrease in the torque applied to the shafts 131, 132. In that the relationship between torque, power and speed are well known in the art no further explanation will be offered at this point.

With reference now to steering the vehicle in the other direction, position "3" shows the steering wheel 53 being turned in a clockwise direction. In this instance, pintle shaft 70 is adjusted so as to increase output power to the drive wheel 7 and consequently pintle shaft 71 is adjusted so as to decrease the steering input with respect to a forward direction of travel. In this particular instance, the output power to the drive wheel 7a is reduced, while output power to drive wheel 7 is increased, each with respect to direction of travel. Referencing position "4", steering wheel 53 is turned still further clockwise, resulting in drive wheel 7a being driven in the reverse direction, while the output power to drive wheel 7 is increased with respect to position "3", resulting in a zero radius turn to the right.

With reference again to position "2", when the operator ceases to depress the foot pedal in the A direction and depresses footpad 98 to actuate the foot pedal in the B direction, fluid power from the pump 31 is reversed, causing each of the respective drive motors 34, 35 to also be driven in the opposite direction. It is especially noted, at this point, that the magnitude of the first and second steering inputs remains unchanged, while the direction of the first and second steering outputs is reversed, resulting in a proper left hand, rearward turn. It is clear from the aforementioned description of the present invention that the drive system 14 includes a steering means 16 that functions independent from the accelerating means 17. In other words, the first and second steering inputs are not affected by the vehicle speed input. Thus, it can be seen that the zero radius turning of the vehicle 1 in either of the first and second directions is not affected by the forward or reverse direction that the vehicle is being propelled.

Figure 5:
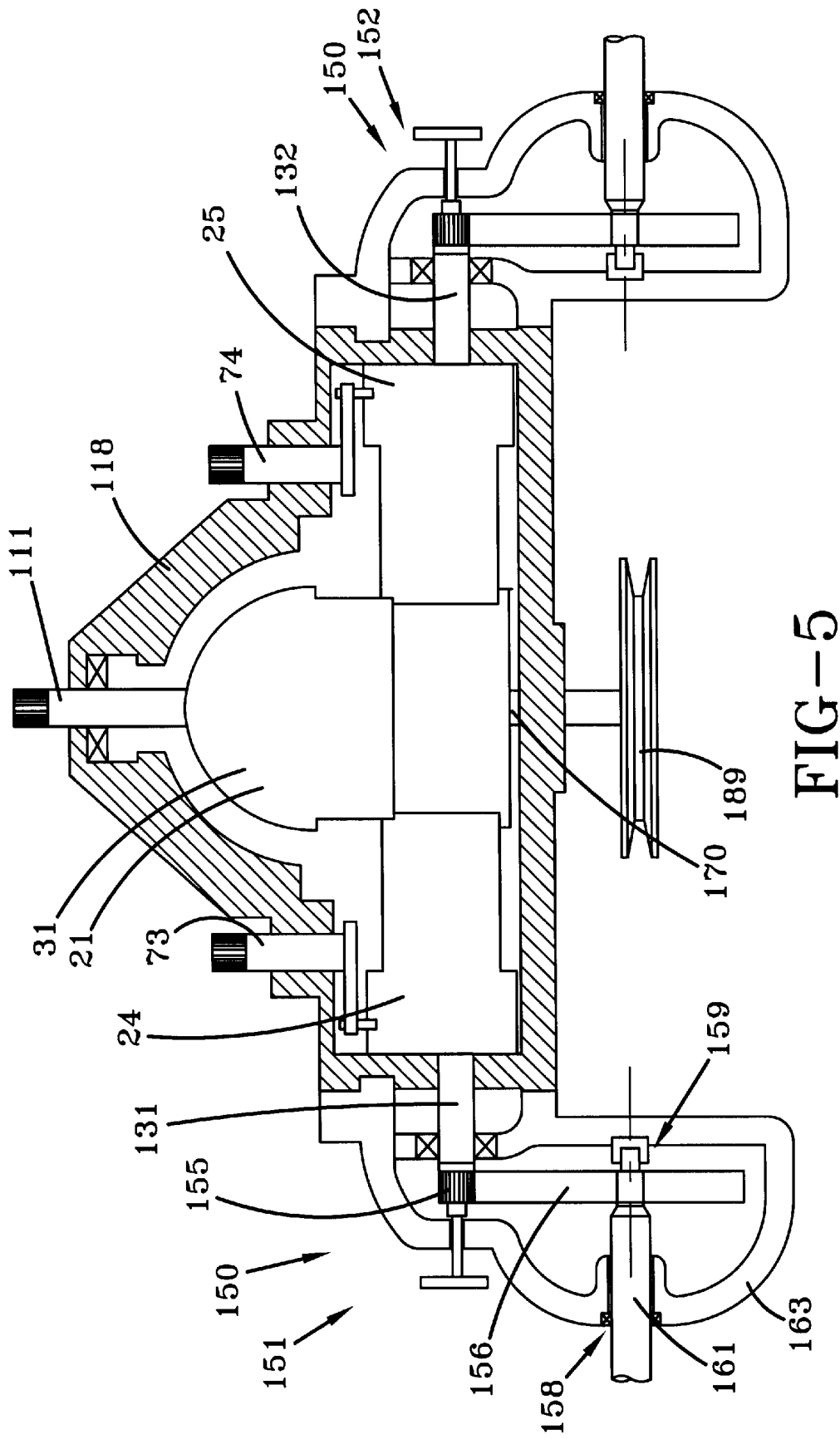
FIG. 5 is a cross sectional view of the alternate embodiment of the drive means with a drop axle and transmission means.

With reference now to FIG. 5 and an alternate embodiment of the present invention, transmission means are shown generally at 150 operatively attached to the output shafts 131, 132 respectively. The transmission means 150 includes first and second transmission assemblies 151, 152. It is noted that the following description only references a first assembly 151 for purposes of clarity. However, it is to be understood that the description applies equally to both transmission assemblies 151, 152. The first transmission assembly 151 may be meshingly connected to shaft 131, as clearly shown in the Figure, via gear 155 so that output power from shaft 131 may be transmitted to the first transmission assembly 151. Gear 155 may include a splined inner bore that is fixedly received onto a splined end of shaft 131. The first transmission assembly 151 further includes a first drop axle 161 that is rotatably mounted at first and second ends 158, 159 within the housing 163 of the first transmission assembly 151. A second gear 156 may include an inner splined bore that is received onto a splined region, not shown, of the drop axle 161 at the second end 159. Additionally, gear 156 includes gear teeth that mesh with the gear teeth of gear 155. Consequently, drive wheels 7 and 7a may be attached to the drop shafts 161 and 161 a respectively for use in raising the ground clearance of the vehicle. In this manner, output power from shaft 131 is operatively communicated to drop axle 161 via gears 155 and 156, which is in turn communicated to drive wheels 7 and 7a. This may be useful for providing increased ground clearance between the under side of the vehicle 1 and/or drive means 19. Therefore, it can be seen that increased ground clearance provides added space for routing a rear discharge chute for channeling debris away from a mower deck as is typically used in the case of a riding lawn vehicle. It is noted that the present embodiment is not limiting in the use of gears 155 and 156 but may include additional gearing or gear reduction means as chosen with sound engineering judgment. Additionally, any ground clearing distance, as realized by the inclusion of a transmission means 150 may be chosen with sound engineering judgment as is appropriate for use on a law care vehicle.

In another alternate embodiment, it is contemplated that a Power Take Off shaft 170 or PTO shaft 170 may be extended from drive means 19 through the housing 188. A pulley 189 having a splined inner bore may be included that is fixedly received onto the PTO shaft 170 for use in transferring operating power to drive a vehicle implement. The PTO shaft 170 maybe meshingly connected to the power input 110, which in turn receives power from the engine 3.

While specific embodiments of the invention have been described and illustrated, it is to be understood that these embodiments are provided by way of example only and that the invention is not to be construed as being limited thereto, but only by proper scope of the following claims.

I/we claim:

1. A drive system for use on an associated vehicle, the vehicle including a frame, an engine operatively attached to the frame, first and second ground engaging means operatively connected to the frame for use in providing mobility to the vehicle, the drive system comprising:

a pumping means operatively driven by the associated engine, the pumping means having a vehicle-speed input, the pumping means being operable to deliver output power responsive to the vehicle-speed input;

first and second double acting actuators, wherein the output power from the pumping means is operatively communicated in parallel to the first and second double acting actuators, the first double acting actuator having a first steering input that is selectively adjustable and a first steering output responsive to the first steering input, the first steering output being driveably connected to drive the first associated ground engaging means in forward and reverse directions, the second double acting actuator having a second steering input that is selectively adjustable and a second steering output responsive to the second steering input, the second steering output being driveably connected to drive the second associated ground engaging means in forward and reverse directions, and wherein the first and second actuators are independently driven;

a steering member selectively adjustable in first and second steering directions, the steering member being operably connected to engage the first and second steering inputs, wherein, when the steering member is adjusted in the first steering direction, the first steering output is increased with respect to a forward direction and the second steering output is decreased with respect to the forward direction, and, wherein, when the steering member is adjusted in the second steering direction, the first steering output is decreased with respect to a forward direction and the second steering output is increased with respect to the forward direction; and, an accelerator member operably connected to engage the vehicle-speed input.

2. The drive system of claim 1, wherein the pumping means is operable to selectively deliver bi-directional output power responsive to the vehicle-speed input, and, wherein, the accelerator member is selectively adjustable in first and second accelerator directions for use in driving the vehicle in the forward and reverse directions respectively.

3. The drive system of claim 2, wherein the pumping means is operable to selectively deliver variable output power responsive to the vehicle-speed input, and, wherein, the accelerator member is selectively infinitely positionable within first and second limiting positions for use in driving the vehicle at variable rates of speed.

4. The drive system of claim 3, wherein the pumping means comprises:

a double acting variable displacement hydraulic pump.

5. The drive system of claim 4, wherein the vehicle-speed input is a pintle shaft.

6. The drive system of claim 1, wherein the first and second double acting actuators are first and second double acting variable displacement hydraulic motors, respectively.

7. The drive system of claim 6, wherein the first steering input is a pintle shaft fixedly attached to the first hydraulic motor, and wherein, the second steering input is a pintle shaft fixedly attached to the second hydraulic motor.

8. The drive system of claim 1, wherein the steering member is a steering wheel rotatably attached with respect to the associated vehicle frame, and further comprising:

a first steering gear operatively rigidly attached to the steering wheel;

a steering wedge having a gear tooth region, wherein the first steering gear operatively meshingly engages the steering wedge;

a first steering linkage having first and second ends, the first end of the first steering linkage being operatively attached to the pintle shaft of the first hydraulic motor, the second end of the first steering linkage being operatively attached to the steering wedge; and, a second steering linkage having first and second ends, the first end of the second steering linkage being operatively attached to the pintle shaft of the second hydraulic motor, the second end of the second steering linkage being operatively attached to the steering wedge.

9. The drive system vehicle of claim 1, wherein, when the accelerator member is increasingly adjusted in a first direction, the magnitude of the output of the first and second actuators is increased with respect to a forward direction of travel, and, wherein, when the accelerator member is increasingly adjusted in a second direction, the magnitude of the output of the first and second actuators is decreased with respect to a forward of travel.

10. A Zero Turn Radius vehicle, comprising:

a frame;

an engine operatively attached to the frame;

first and second ground engaging means for use in providing mobility to the vehicle;

a pumping means operatively driven by the engine, the pumping means having a vehicle-speed input, the pumping means being operable to selectively deliver output power in response to the vehicle-speed input;

first and second double acting actuators, wherein the output power from the pumping means is operatively communicated in parallel to the first and second double acting actuators, the first double acting actuator having a first steering input that is selectively adjustable and a first steering output responsive to the first steering input, the first steering output being driveably connected to drive the first ground engaging means in forward and reverse directions, the second double acting actuator having a second steering input that is selectively adjustable and a second steering output responsive to the second steering input, the second steering output being driveably connected to drive the second ground engaging means in forward and reverse directions, and wherein the first and second actuators are independently driven;

a steering member selectively adjustable in first and second steering directions, the steering member being operably connected to engage the first and second steering inputs, wherein, when the steering member is adjusted in the first steering direction, the first steering output is increased with respect to a forward direction and the second steering output is decreased with respect to the forward direction, and, wherein, when the steering member is adjusted in the second steering direction, the first steering output is decreased with respect to a forward direction and the second steering output is increased with respect to the forward direction; and, an accelerator member operably connected to engage the vehicle-speed input, the accelerator member being selectively adjustable in first and second accelerator directions for use in driving the vehicle in the forward and reverse directions respectively.

11. The Zero Turn Radius vehicle of claim 10, wherein, when the accelerator member is increasingly adjusted in a first direction, the magnitude of the output of the first and second actuators is increased with respect to a forward direction of travel and the ratio of the first steering input to the second steering input remains unchanged, and, wherein, when the accelerator member is increasingly adjusted in a second direction, the magnitude of the output of the first and second actuators is decreased with respect to forward direction of travel and the ratio of the first steering input to the second steering input remains unchanged.

12. A Zero Turn Radius mower, comprising:

a frame;

a mower deck operatively attached to the frame;

an engine operatively attached to the frame;

first and second ground engaging wheels rotatably connected with respect to the frame;

a hydrostatic transmission including:

a double acting variable displacement pump operatively connected to the engine, the pump having a first input, the pump being operable to selectively deliver bi-directional variable output fluid power, in response to the first input;

first and second double acting motors, wherein the output power from the variable displacement pump is operatively communicated in parallel to the first and second double acting motors, the first double acting motors having a first steering input that is selectively adjustable and a first steering output responsive to the first steering input, the first steering output being rotatably connected to drive the first ground engaging wheel in forward and reverse directions, the second double acting motor having a second steering input that is selectively adjustable and a second steering output, responsive to the second steering input, the second steering output being rotatably connected to drive the second ground engaging wheel in forward and reverse directions, and, wherein, the first and second motors are independently driven;

a steering wheel rotatably adjustable in first and second steering directions, the steering wheel being operably connected to engage the first and second steering inputs, wherein, when the steering wheel is adjusted in the first steering direction the first steering output is increased with respect to a forward direction and the second steering output is decreased with respect to the forward direction, and, wherein, when the steering wheel is adjusted in the second steering direction the first steering output is decreased with respect to a forward direction and the second steering output is increased with respect to the forward direction; and, an accelerator lever operably connected to engage the first input to the variable displacement pump, the accelerator lever being selectively adjustable in first and second accelerator directions for use in driving the vehicle in the forward and reverse directions respectively.

* * * * *